United States Patent Office 2,934,503
Patented Apr. 26, 1960

2,934,503

SCALE INHIBITING COMPOSITION

Joseph F. Chittum, Whittier, Calif., and Gilson H. Rohrback, Seattle, Wash., assignors to California Research Corporation, San Francisco, Calif., a corporation of Delaware No Drawing. Application April 29, 1953
Serial No. 352,044

6 Claims. (Cl. 252—181)

This invention relates to a composition which prevents the deposition of carbonate scale on metal surfaces. More particularly, the invention relates to an inhibitor composition which is extremely effective in preventing the deposition of carbonate scale on the surfaces of heat exchanger tubes as a result of thermal decomposition of bicarbonates contained in solution in the cooling water which is passed over the exterior surfaces of the heat exchange tubes to cool the hot material being circulated through the tubes and which is generally effective in preventing deposition of carbonate scale on the inside of tubes and pipes carrying water.

U.S. Patent No. 2,592,511 to J. F. Chittum describes a method for inhibiting the deposition of impingement scale on metallic surfaces in zones of turbulent flow in producing oil wells. Deposition of impingement scale in these wells is prevented by introducing a mixture of an alkali metal polyphosphate and a water-soluble sulfonate wetting agent into the well.

The deposition of carbonate scale on metallic heat exchange surfaces in indirect heat exchangers constitutes a serious problem. In typical operation of such an exchanger the hot liquid which is required to be cooled is circulated through a metal tube which is cooled by flowing cooling water over the exterior surface of the tube. The cooling water employed is natural water and invariably has appreciable contents of calcium and magnesium ions and bicarbonate ion. As the cooling water contacts the exterior surface of the heat exchange tube, it is heated and the bicarbonate ions contained in the water are decomposed with the result that calcium and magnesium carbonates are precipitated on the surface of the exchanger tube. These materials adhere strongly to the surface of the tube and gradually build up, forming a heavy scale which is a relatively poor heat conductor. As the scale deposit accumulates on the surface of the heat exchanger tubes, the efficiency of the exchanger gradually decreases and finally reaches the point at which it is necessary to take the exchanger out of operation and subject the tubing to a descaling treatment.

The method of preventing the development of impingement scale described in U.S. Patent No. 2,592,511 which proved so successful in producing oil wells was tried in a cooling tower and proved ineffective in preventing the deposition of scale as a result of thermal decomposition of the bicarbonates contained in the cooling water.

It has now been found that thermal deposition of carbonate scale on metal surfaces can be virtually eliminated by adding to the cooling water passing over the metallic heat exchange surface a small amount of an inhibitor concentrate containing an alkali metal polyphosphate, a water-soluble alkyl aryl sulfonate wetting agent, and an oil-soluble alkyl aryl sulfonate dispersed in a material of the group consisting of water, and water containing up to 20% by weight of an alcohol containing 1 to 4 carbon atoms per molecule.

The effectiveness of the inhibitor composition is considerably enhanced by incorporating in it a small amount of a lubricating oil having an A.P.I. gravity in the range from 20 to 25.

When the inhibitor is prepared as a concentrate for periodic addition, or continuous addition to the cooling water, a small amount of a water-soluble alkali metal naphthenate is desirably added to solubilize the oil-soluble sulfonate and the lubricating oil. Additionally, a small amount of a water-soluble nonionic detergent prepared by condensing ethylene oxide with an alcohol, an alkyl phenol, or a mercaptan, is desirably added to the concentrate to prevent crystallization of the water-soluble sulfonate at low temperatures.

The compositions of the individual components of the inhibitor concentrate are shown below.

THE ALKALI METAL POLYPHOSPHATE

The calcium-sequestering polyphosphates are all effective as the polyphosphate component of the inhibitor. Sodium tripolyphosphate, sodium hexa-meta-phosphate, and tetrasodium pyrophosphate are the preferred polyphosphate components of the concentrate.

THE WATER-SOLUBLE SULFONATE WETTING AGENT

Water-soluble alkyl aryl sulfonates containing one or more alkyl groups having an aggregate of 6 to 16 carbon atoms in the alkyl chains are effective as the water-soluble sulfonate wetting agent component of the inhibitor concentrate. Water-soluble petroleum sulfonates obtained as by-products during the acid treating of light spray oils and insulating oils are effective as the water-soluble sulfonate component. These sulfonates ordinarily have molecular weights in the range from about 300 to 400. Synthetic water-soluble sulfonate detergents, such as those described in Lewis U.S. Patent No. 2,477,383, are effective as the water-soluble sulfonate component. Similarly, the Keryl benzene sulfonates prepared by alkylating benzene with chlorinated kerosene and then sulfonating the alkyl benzene are also effective water-soluble sulfonate components.

THE OIL-SOLUBLE SULFONATE COMPONENT

Oil-soluble sulfonates formed as by-products during the acid treating of heavy white oils, spray oils, and lubricating oils are effective as the oil-soluble sulfonate component of the concentrate. These sulfonates have molecular weights in the range from 550 to 700 and are highly soluble in oil and dispersible in water.

THE OIL COMPONENT OF THE CONCENTRATE

Heavy relatively inert petroleum fractions such as lubricating oils are employed as the oil component of the inhibitor concentrate. Suitable oils are those having an A.P.I. gravity in the range from 20 to 25 and can be obtained by fractionally distilling crude oil to separate out such a lubricating oil fraction.

THE NAPHTHENATE COMPONENT OF THE CONCENTRATE

Water-soluble naphthenates having molecular weights in the range from about 250 to 375 and commonly obtained as by-products during caustic treating of petroleum stocks are suitable as the naphthenate component of the concentrate.

THE WATER-SOLUBLE POLYOXYALKYLENE NONIONIC DETERGENT COMPONENT

To stabilize the concentrate at low temperature in the sense of preventing crystallization of the water-soluble sulfonate wetting agent, a water-soluble nonionic detergent is added to the concentrate. The nonionic detergent is prepared by condensing 6 to 14 molecules of ethylene oxide with either an aliphatic alcohol or a mercaptan containing 8 to 18 carbon atoms or with an alkyl phenol containing 6 to 14 carbon atoms in the alkyl chain. These water-soluble nonionic detergents are all effective in solubilizing the water-soluble sulfonate wetting agent and preventing its crystallization from the concentrate at temperatures as low as 30° F.

THE SOLVENT OR CARRIER

In preparing the concentrate, the effective components as indicated above can be dissolved or dispersed in water alone. However, it is preferred to disperse these materials in aqueous alcohol containing up to 20% by weight of alcohol. Methanol, ethanol, propanol, isopropanol, or the butanols can be used as the alcohol component of the aqueous alcohol. Isopropanol is preferred.

The composition and effectiveness of the concentrates of the invention are illustrated in the following examples. In the tests of effectiveness of the inhibitor, water at about 215° F. was passed through a cooling coil made up of a series of ten 40 inch metal tubes. Cooling water containing the inhibitor concentrate was passed over the exterior of the tubes. The hot water entered the lowest tube and circulated upwardly through a ladder of tubes, being withdrawn from the top tube at about 115° F. The cooling water flowed downwardly from the top tube to the bottom tube of the series so that cooling was countercurrent. Scale formed on the tubes beginning at the point of introduction of the hot water in the bottom tube. As scale growth progressed, a film of scale gradually worked its way across the entire length of the bottom tube and then across the next highest tube, etc. The time in hours necessary for a scale film to cover the bottom five tubes was measured and recorded.

Example 1

An inhibitor concentrate was prepared by dispersing 6 parts by weight of tetrasodium pyrophosphate, 5 parts by weight of a water-soluble sulfonate wetting agent and 3 parts by weight of an oil-soluble sulfonate detergent in 100 parts by weight of water. The water-soluble wetting agent was prepared by acid treating a light spray oil with concentrated sulfuric acid, gathering the sulfonic acid with alcohol and neutralizing the sulfonic acid with sodium hydroxide. The sulfonate had a molecular weight of 370; it had an A.S.T.M. color of 1.5 in a 5% solution in distilled water; a pH of 7.7 in a 1% solution in distilled water; and a wetting time of 14 seconds for cotton duck immersed in a 0.5% solution. The oil-soluble sulfonate was prepared by acid treating a lubricating oil, gathering the sulfonic acid with alcohol, and neutralizing the sulfonic acid with sodium hydroxide. The sulfonate had a molecular weight of 650 and was readily soluble in oil. When this concentrate was added to cooling water in amount sufficient to give the cooling water a content of 60 parts total active ingredients per million, the time required for the accumulation of a scale coating across the bottom five tubes was 75 hours.

Example 2

An inhibitor concentrate was prepared by dispersing 6 parts by weight of a water-soluble sulfonate wetting agent of the type described in Lewis U.S. Patent No. 2,477,383, 8 parts by weight of sodium hexa-meta-phosphate, 8 parts by weight of an oil-soluble sulfonate-naphthenate mixture, and ½ part by weight of a water-soluble nonionic detergent prepared by condensing 10 molecules of ethylene oxide with one molecule of lauryl alcohol in 100 parts by weight of a 5% solution of ethanol in water. The oil-soluble sulfonate-naphthenate agent was prepared by acid treating a lubricating oil with concentrated sulfuric acid, separating the sludge, adding sodium naphthenate having a molecular weight of 325 to the acid treated oil, and washing the oil with caustic. A caustic phase was separated, concentrated and extracted with a petroleum thinner to recover the sulfonate-naphthenate mixture. The thinner was evaporated, leaving a sulfonate-naphthenate mixture containing 29% by weight of oil-soluble sulfonate containing from 30 to 40 carbon atoms per molecule, 17% by weight of sodium naphthenate containing from 12 to 20 carbon atoms per molecule, and 54% of a lubricating oil. The sulfonate-naphthenate mixture recovered had a specific gravity of .98, a pH of 8.9 in 5% water dispersion, a sulfonate-naphthenate ratio of 1.7:1, and weighed 8.2 pounds per gallon. This concentrate was added to the cooling water in amount sufficient to give it a content of 60 parts total active ingredients per million. The time required for development of scale along the entire length of the bottom five tubes was 105 hours.

Example 3

A concentrate was prepared by dispersing 8 parts by weight of tetrasodium pyrophosphate, 8 parts by weight of isopropanol, 6 parts by weight of the water-soluble wetting agent of Example 1, ½ part by weight of a nonionic detergent prepared by condensing 6 molecules of ethylene oxide with 1 molecule of octyl phenol, and 8 parts by weight of the sulfonate-naphthenate mixture described in Example 2 in 100 parts by weight of water. This concentrate was added to cooling water in amount sufficient to give the cooling water a content of 30 parts total active ingredients per million. The time required for the development of scale along the entire length of the bottom five tubes was 90 hours.

A number of tests was run, using cooling water without any inhibitor, using several commercial inhibitors, using sodium hexa-meta-phosphate, using the inhibitor material described in U.S. Patent No. 2,592,511, and using the inhibitor of Example 3. The results of these tests are shown in the following table:

| Inhibitor | Time at 30 p.p.m. | Time at 60 p.p.m. |
| --- | --- | --- |
| None | .5 | .5 |
| Commercial Inhibitor #1 | 1.0 | 1.0 |
| Commercial Inhibitor #2 | 2.25 | 2.25 |
| Commercial Inhibitor #3 | 2.5 | 2.5 |
| Commercial Inhibitor #4 | 2.5 | 2.75 |
| Sodium Hexa-meta-phosphate | 2.75 | 3.0 |
| Inhibitor of Patent 2,592,511 | 3.0 | 3.5 |
| Inhibitor of Example 3 | 90.0 | 110.0 |

The data in the foregoing examples and in the table illustrate the extraordinary effectiveness of the inhibitor concentrate of the invention.

In tests similar to those described in the examples above, the concentration ranges were determined for the several components suitable for use in compounding a concentrate which is effective when employed in amounts from about 15 to about 100 parts total active ingredients per million based on the cooling water. These amounts were as follows: For each 100 parts by weight of water or aqueous alcohol 4 to 12 parts by weight of the water-soluble alkali metal polyphosphate are added. 2 to 7 parts by weight of the water-soluble sulfonate wetting agent are added. 1.5 to 8.5 parts by weight of the oil-soluble sulfonate detergent are added. When lubricating oil is added to the concentrate in the preferred manner, 3 to 10 parts by weight of lubricating oil are added to each 100 parts by weight of water or aqueous alcohol. 1 to 6 parts by weight of water-soluble naphthenate are added to each 100 parts by weight of water or aqueous alcohol, especially when the lubricating oil is used. From 0.1 to 1 part by weight of water-soluble polyoxyalkylene nonionic detergent is added to each 100 parts by weight of water or aqueous alcohol to stabilize the water-soluble sulfonate wetting agent in the concentrate.

We claim:

1. A scale inhibitor comprising a dispersion of 4 to 12 parts by weight of a sodium polyphosphate, 2 to 7 parts by weight of a water-soluble alkyl aryl sulfonate wetting agent containing 6 to 16 carbon atoms in the alkyl group, 1.5 to 8.5 parts by weight of an oil-soluble petroleum sulfonate detergent having a molecular weight in the range from about 550 to 700, and 1 to 6 parts by weight of a water-soluble naphthenate having a molecular weight in the range from about 250 to 375 in 100 parts by weight of the material selected from the group consisting of water and water containing up to 20% by weight of an alcohol containing from 1 to 4 carbon atoms per molecule.

2. A scale inhibitor comprising a dispersion of 4 to 12 parts by weight of a sodium polyphosphate, 2 to 7 parts by weight of a water-soluble alkyl aryl sulfonate wetting agent containing 6 to 16 carbon atoms in the alkyl group, 1.5 to 8.5 parts by weight of an oil-soluble petroleum sulfonate detergent having a molecular weight in the range about 550 to 700, and 0.1 to 1 part by weight of a water-soluble nonionic detergent which is the condensation product of ethylene oxide with a material selected from the group consisting of alcohols containing 8 to 18 carbon atoms per molecule and alkyl phenols containing 6 to 16 carbon atoms in the alkyl chain in 100 parts by weight of a material of the group consisting of water and water containing up to 20% by weight of an alcohol containing 1 to 4 carbon atoms per molecule.

3. A scale inhibitor comprising a dispersion of 4 to 12 parts by weight of a sodium polyphosphate, 2 to 7 parts by weight of a water-soluble alkyl aryl sulfonate wetting agent containing 6 to 16 carbon atoms in the alkyl group, 1.5 to 8.5 parts by weight of an oil-soluble petroleum sulfonate detergent having a molecular weight in the range 550 to 700, 3 to 10 parts by weight of a petroleum lubricating oil having an A.P.I. gravity in the range from about 20 to 25 and 1 to 6 parts by weight of a water-soluble naphthenate having a molecular weight in the range from 250 to 375 in 100 parts by weight of a material consisting of water and water containing up to 20% by weight of an alcohol containing 1 to 4 carbon atoms per molecule.

4. A scale inhibitor comprising a dispersion of 4 to 12 parts by weight of a sodium polyphosphate, 2 to 7 parts by weight of a water-soluble alkyl aryl sulfonate wetting agent containing 6 to 16 carbon atoms in the alkyl group, 1.5 to 8.5 parts by weight of an oil-soluble petroleum sulfonate detergent, 3 to 10 parts by weight of a petroleum lubricating oil having an A.P.I. gravity in the range from about 20 to 25 and 0.1 to 1 part by weight of a water-soluble nonionic detergent which is the condensation product of ethylene oxide with a material selected from the group consisting of aliphatic alcohols containing 8 to 18 carbon atoms per molecule and alkyl phenols containing 6 to 16 carbon atoms in the alkyl chain in 100 parts by weight of the material consisting of water and water containing up to 20% by weight of an alcohol containing 1 to 4 carbon atoms per molecule.

5. A scale inhibitor comprising a dispersion of 4 to 12 parts by weight of a sodium polyphosphate, 2 to 7 parts by weight of a water-soluble alkyl aryl sulfonate wetting agent containing 6 to 16 carbon atoms in the alkyl group, 1.5 to 8.5 parts by weight of an oil-soluble petroleum, sulfonate detergent having a molecular weight in the range about 550 to 700, 1 to 6 parts by weight of a water-soluble naphthenate having a molecular weight in the range from 250 to 375 and 0.1 to 1 part by weight of a water-soluble nonionic detergent which is the condensation product of ethylene oxide with a material selected from the group consisting of aliphatic alcohols containing 8 to 18 carbon atoms per molecule and alkyl phenols containing 6 to 16 carbon atoms in the alkyl chain in 100 parts by weight of a material of the group consisting of water and water containing up to 20% by weight of an alcohol containing 1 to 4 carbon atoms per molecule.

6. A scale inhibitor comprising a dispersion of 4 to 12 parts by weight of a sodium polyphosphate, 2 to 7 parts by weight of a water-soluble alkyl aryl sulfonate wetting agent containing 6 to 16 carbon atoms in the alkyl group, 1.5 to 8.5 parts by weight of an oil-soluble alkyl aryl sulfonate detergent, 3 to 10 parts by weight of a petroleum lubricating oil having an A.P.I. gravity in the range from about 20 to 25, 1 to 6 parts by weight of a water-soluble naphthenate having a molecular weight in the range 250 to 375 and 0.1 to 1 part by weight of a water-soluble nonionic detergent which is the condensation product of ethylene oxide with a material selected from the group consisting of aliphatic alcohols containing 8 to 18 carbon atoms per molecule and alkyl phenols containing 6 to 16 carbon atoms in the alkyl chain in 100 parts by weight of a material of the group consisting of water and water containing up to 20% by weight of an alcohol containing 1 to 4 carbon atoms per molecule.

References Cited in the file of this patent

UNITED STATES PATENTS

| | | |
|---|---|---|
| 2,531,166 | Shaw | Nov. 21, 1950 |
| 2,580,765 | Hall | Jan. 1, 1952 |
| 2,592,511 | Chittum | Apr. 8, 1952 |